United States Patent
Seo et al.

(10) Patent No.: US 7,817,190 B2
(45) Date of Patent: Oct. 19, 2010

(54) METHOD AND APPARATUS FOR PROCESSING AN IMAGE EXPOSED TO BACKLIGHT

(75) Inventors: Sung Ha Seo, Pyeongtaek-si (KR); Kyun Ho Kang, Pyeongtaek-si (KR); Jong Tae Choi, Pyeongtaek-si (KR); Byung Jin Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 11/781,570

(22) Filed: Jul. 23, 2007

(65) Prior Publication Data
US 2008/0024623 A1    Jan. 31, 2008

(30) Foreign Application Priority Data
Jul. 24, 2006    (KR) .................... 10-2006-0069039

(51) Int. Cl.
    H04N 5/243    (2006.01)
    H04N 5/272    (2006.01)
    H04N 5/202    (2006.01)
(52) U.S. Cl. .................... 348/230.1; 348/239; 348/255
(58) Field of Classification Search ............. 348/229.1, 348/230.1, 254, 255, 256, 239
    See application file for complete search history.

(56) References Cited

U.S. PATENT DOCUMENTS

| | | | | |
|---|---|---|---|---|
| 4,969,045 A | * | 11/1990 | Haruki et al. ............. | 348/229.1 |
| 5,049,997 A | * | 9/1991 | Arai ........................... | 348/364 |
| 5,339,163 A | * | 8/1994 | Homma et al. ........... | 348/229.1 |
| 5,416,515 A | * | 5/1995 | Arai et al. ................. | 348/229.1 |
| 5,442,397 A | * | 8/1995 | Yoshimura et al. .......... | 348/362 |
| 5,614,948 A | * | 3/1997 | Hannah ...................... | 348/255 |
| 6,831,696 B1 | * | 12/2004 | Saeki ......................... | 348/229.1 |
| 6,940,556 B1 | * | 9/2005 | Tamune ....................... | 348/254 |
| 2005/0157173 A1 | * | 7/2005 | Kurebayashi et al. ..... | 348/211.8 |
| 2005/0195317 A1 | * | 9/2005 | Myoga ......................... | 348/370 |
| 2006/0245007 A1 | * | 11/2006 | Izawa et al. ................. | 358/448 |
| 2009/0066819 A1 | * | 3/2009 | Ando .......................... | 348/254 |

FOREIGN PATENT DOCUMENTS

| | | | |
|---|---|---|---|
| JP | 4-167227 A | | 6/1992 |
| JP | 06-098254 A | | 4/1994 |
| JP | 09214827 A | * | 8/1997 |
| JP | 2003-272171 A | | 9/2003 |
| JP | 2003-272172 A | | 9/2003 |
| JP | 2006-311108 A | | 11/2006 |

* cited by examiner

*Primary Examiner*—Jason Whipkey
(74) *Attorney, Agent, or Firm*—Birch, Stewart, Kolasch & Birch, LLP

(57) ABSTRACT

An imaging processing device and method where, when areas having a luminance difference set by a user, for example, 45 dB or more, are preset in an image captured by a camera, an area, the luminance level of which exceeds a predetermined threshold level, may be displayed as a gray level or a black level, with the luminance thereof decreased by a certain luminance level, or may be displayed while a mask, having a gray or black level, and the area, the luminance level of which exceeds the predetermined threshold level, overlap each other. Therefore, glare caused by a high luminance subject can be decreased, or other subjects present in a backlit image can be easily recognized.

22 Claims, 7 Drawing Sheets

(Mask size adjustment)

(Mask size adjustment)

FIG. 8

(Area size adjustment)

METHOD AND APPARATUS FOR PROCESSING AN IMAGE EXPOSED TO BACKLIGHT

BACKGROUND OF THE INVENTION

1. Field of the Invention

The present invention relates, in general, to an image processing method, and more particularly, to a method of correcting an image exposed to backlight.

2. Description of the Related Art

Recently, a video camera or a digital camera is implemented to perform an auto exposure control function. Accordingly, when an image is captured toward the sun or bright light sources, that is, when backlight photography is performed, the camera determines that the surroundings are very bright, and increases the value of an iris diaphragm, or increases shutter speed, thus reducing the amount of light incident on the Charge Coupled Device (CCD) of the camera.

Further, most recent cameras are implemented to perform a backlight compensation function. That is, when a subject much brighter than the surroundings, or a light source is present in the image captured in a backlight compensation mode, such a camera determines that current light is backlight, and increases the amount of light incident on the CCD so as to recognize a relatively dark subject around the light source or the bright subject, thus correcting exposure.

In such a backlit condition, when the amount of light incident on a CCD increases, the relatively dark subject is brightened to some degree, but the luminance of the light source or the bright subject further increases, thus straining eyes viewing the screen, and preventing the relatively dark subject from being recognized due to the glare of light.

SUMMARY OF THE INVENTION

Accordingly, the present invention has been made keeping in mind the above problems occurring in the prior art, and an object of the present invention is to provide a method of improving the capability of recognizing subjects within a backlit image.

In order to accomplish the above object, the present invention provides an image processing method, comprising dividing an image captured by a camera into a plurality of areas and detecting luminance levels of respective areas; and adjusting a luminance level of a high luminance area to a lower level when areas having a luminance difference therebetween equal to or greater than a predetermined reference level are present.

In an embodiment of the present invention, the luminance level may be adjusted such that luminance of an area, a luminance level of which exceeds a predetermined threshold level, is decreased by a certain luminance level, and luminance of the high luminance area may be decreased to a gray level or a black level.

In an embodiment of the present invention, the image processing method may further comprise increasing an amount of light incident on the camera when areas having a luminance difference therebetween equal to or greater than a predetermined reference level are present. The amount of incident light may be increased by adjusting an opening degree of an iris of the camera and/or a speed of a shutter of the camera. The predetermined reference level may be a luminance difference of 45 dB.

In addition, the present invention provides an image processing method, comprising dividing an image captured by a camera into a plurality of areas and detecting luminance levels of respective areas; and generating a mask corresponding to a high luminance area and overlapping the mask with the high luminance area when areas having a luminance difference therebetween equal to or greater than a predetermined reference level are present.

In an embodiment of the present invention, the mask may be generated in a pattern, such as a circle or rectangle, having a size that hides the high luminance area, or may be generated in a shape corresponding to a contour of an area, a luminance level of which exceeds a predetermined threshold level. In the latter case, the predetermined threshold level, which is a basis of generation of the mask, may be adjusted.

In an embodiment of the present invention, the mask may have luminance corresponding to a gray level or a black level. Further, the mask may be implemented such that, when it has a low luminance level and is translucent, or when it is provided with oblique lines, a luminance level of the high luminance area is adjusted to a lower level. The luminance of an area, a luminance level of which exceeds a predetermined threshold level, may be decreased by a certain luminance level.

In an embodiment of the present invention, the mask may be generated on a basis of a cell required to divide the image, and may be generated in an arbitrary cell when an average luminance value of pixels included in the arbitrary cell exceeds a predetermined threshold level. A size of a cell, which is a unit of generation of the mask, may be adjusted. In this case, the cell, which is a unit of generation of the mask, may have a size different from that of each division area required to detect the luminance levels, or may have a size greater than that of each division area required to detect the luminance levels.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, embodiments of an image processing method according to the present invention will be described in detail with reference to the attached drawings.

In the present invention, image data input through a Charge Coupled Device (CCD) is processed using a line buffer, rather than frame memory, but a modified Gamma curve is applied to image data having brightness above a specific brightness level, and thus the image data is displayed, with the luminance thereof decreased down to a black level or a gray level, that is, to luminance below required brightness.

For this operation, a Gamma correction block is added to the digital signal processing unit of a conventional camera so as to apply a modified Gamma curve. Such a Gamma correction block is operated to decrease the output luminance level when the luminance level of input image data is equal to or greater than a predetermined threshold.

Therefore, the present invention can be applied to various cameras for capturing static images or moving images and displaying the images on an external monitor or on their own display devices, for example, digital cameras, video cameras, monitoring cameras, etc. Further, the image processing method according to the present invention can be applied to situations that are similar to backlight conditions, as in the case of scenes including a window in very bright weather, vehicle headlights, etc.

Figure 1:
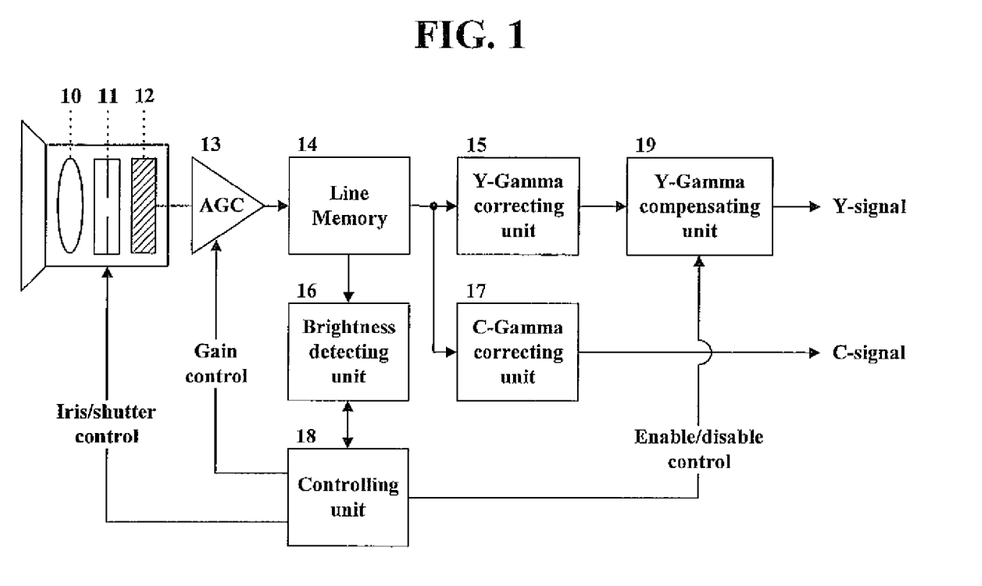
FIG. 1 is a diagram showing the construction of a camera to which an image processing method according to the present invention is applied.

FIG. 1 is a diagram showing the construction of a camera to which an image processing method according to the present invention is applied.

The camera includes a lens 10, an iris 11, a CCD 12, an Automatic Gain Control (AGC) unit 13, line memory 14, a luminance (Y)-Gamma correcting unit 15, a brightness detecting unit 16, a Chrominance (C)-Gamma correcting unit 17, and a controlling unit 18, and may further include a Y-Gamma compensating unit 19.

The controlling unit 18 controls the opening degree of the iris 11 and the speed of a shutter (not shown) so as to adjust the amount of light incident on the COD 12 through the lens 10, that is, exposure.

Further, the controlling unit 18 performs a control operation of increasing or decreasing the level of a pixel signal input to the line memory 14 by controlling the gain of the AGC unit 13. This operation is performed to change the entire level or sensitivity of a captured image.

The brightness detecting unit 16 detects the level of each pixel signal output from the line memory 14, and thus checks the brightness level (luminance) of a captured image. The controlling unit 18 adjusts the opening degree of the iris, shutter speed, gain, etc., on the basis of the brightness level of the captured image, thus maintaining suitable exposure.

Further, the brightness detecting unit 16 determines whether a high luminance subject (or high luminance area) and a low luminance subject (or low luminance area) coexist in a captured image. For this operation, the brightness detecting unit 16 divides a single captured image into a plurality of areas, detects the luminance levels of respective areas, and detects any high luminance level area or low luminance level area that deviates from a preset reference range. Further, the brightness detecting unit 16 determines whether subjects (or areas) having a luminance level difference therebetween equal to or greater than a luminance level difference set by a user, for example, 45 dB coexist in a single captured image.

When both a high luminance area and a low luminance area coexist in a single image, the controlling unit 18 sets a partial backlight compensation mode according to the present invention, and increases the amount of light incident on the CCD 12 by adjusting the opening degree of the iris and/or the speed of the shutter, and outputs an enable control signal, required to drive the operation of the Y-Gamma compensating unit 19 until the low luminance area has luminance sufficient to be recognized.

Figure 2:
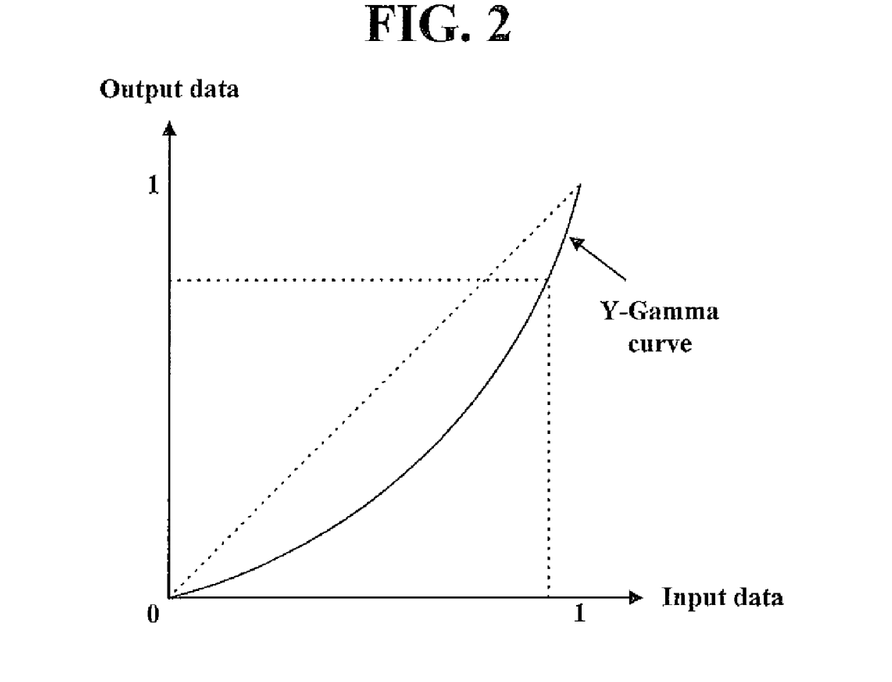
FIG. 2 is a graph showing a typical luminance (Y) Gamma curve.

When the Y-Gamma compensating unit 19 is disabled, data input through the line memory 14 is corrected on the basis of a typical Y-Gamma curve, as shown in FIG. 2, and the corrected data is output to a luminance signal processing unit (not shown).

Figure 3:
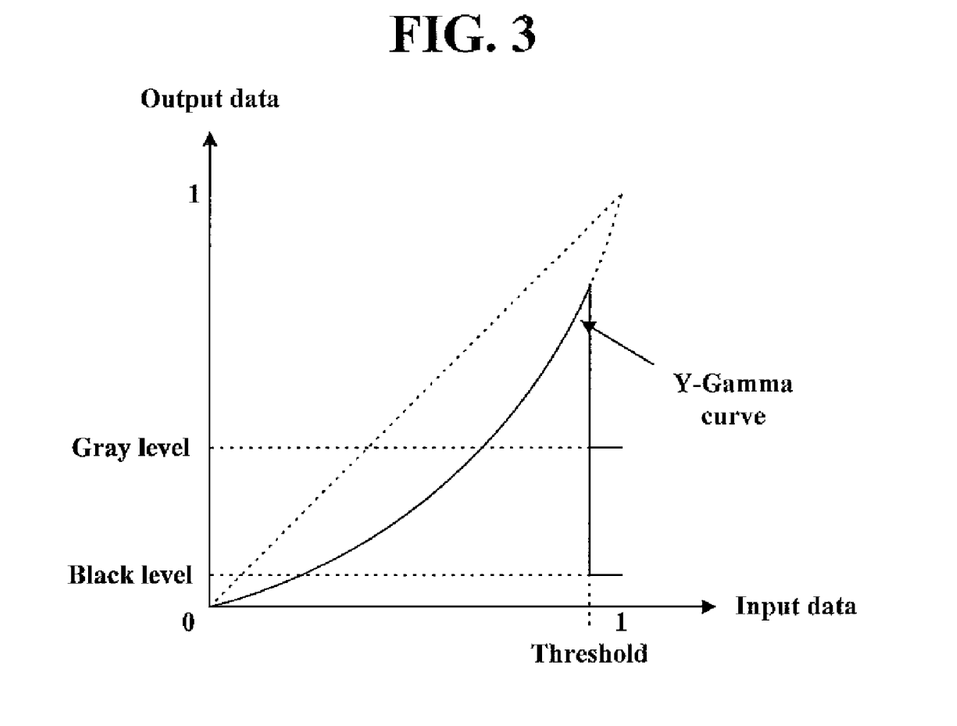
FIG. 3 is a graph showing an embodiment in which a Y-Gamma curve is changed according to the present invention.

Meanwhile, when the Y-Gamma compensating unit 19 is enabled, data input through the line memory 14 is corrected on the basis of the Y-Gamma curve, but, when the input data exceeds a threshold set to a specific level, the luminance level of the input data is corrected to be decreased to a low luminance level corresponding to a gray level or a black level, as shown in FIG. 3, and the luminance-corrected data is output to the luminance signal processing unit.

That is, the Y-Gamma compensating unit 19 decreases the luminance of an area exceeding the threshold, more precisely, the luminance of each pixel exceeding the threshold, by a certain level, thus enabling the differences between respective pixels to be represented.

Figure 4:
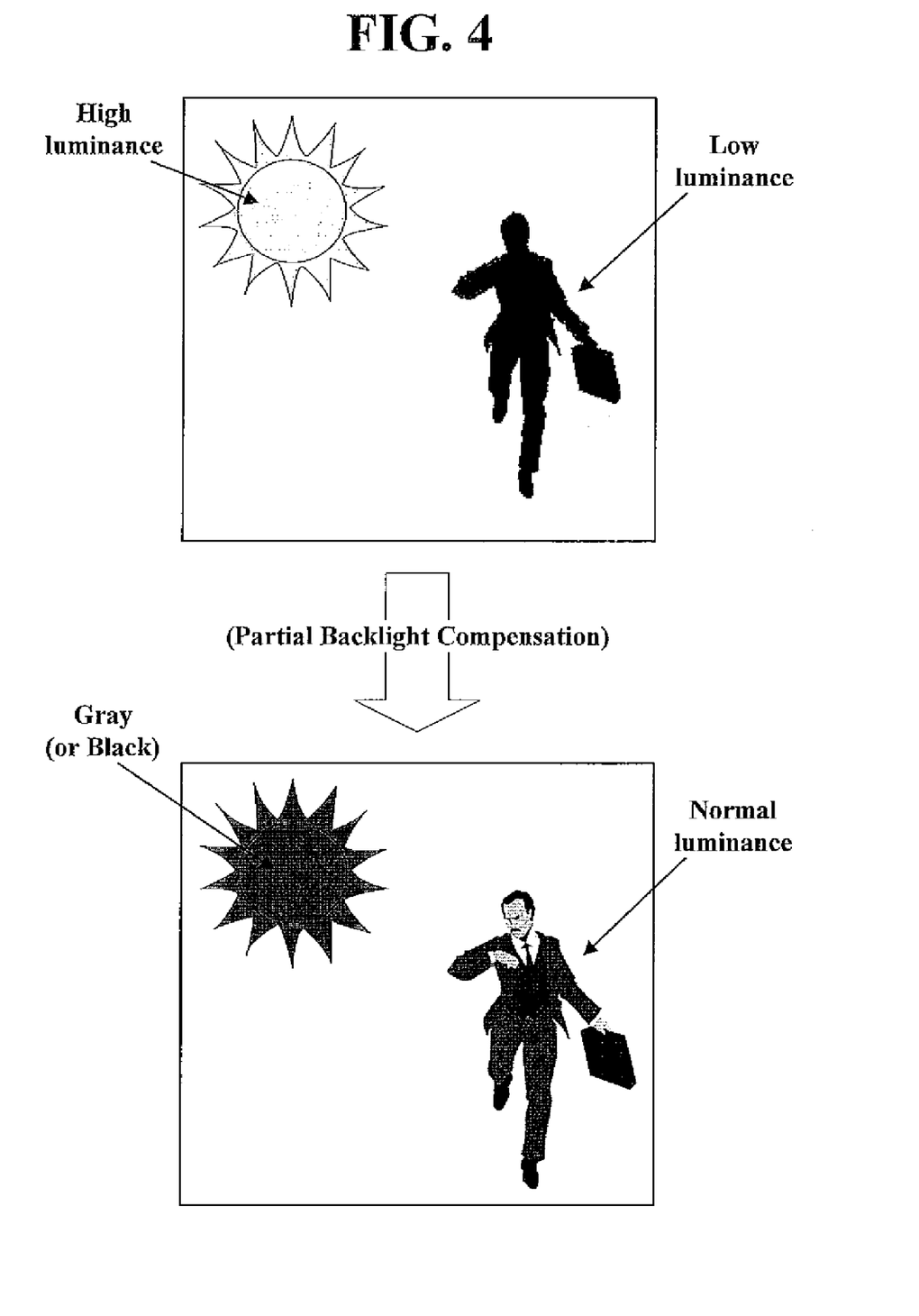
FIG. 4 is a diagram showing an embodiment of a partial backlight compensation operation according to the present invention.

Accordingly, the opening degree of the iris 11 increases or the shutter speed decreases, so that the amount of light incident on the CCD 12 increases. Consequently, as shown in FIG. 4, the low luminance subject included in the image is brightened and then displayed at a luminance sufficient to be recognized.

Further, a high luminance subject exceeding the threshold of the Y-Gamma curve is displayed while the luminance thereof is changed to a gray level or a black level by the Y-Gamma compensating unit 19, thus reducing glare caused by the high luminance subject, and facilitating the recognition of a relatively dark subject.

Figure 5:
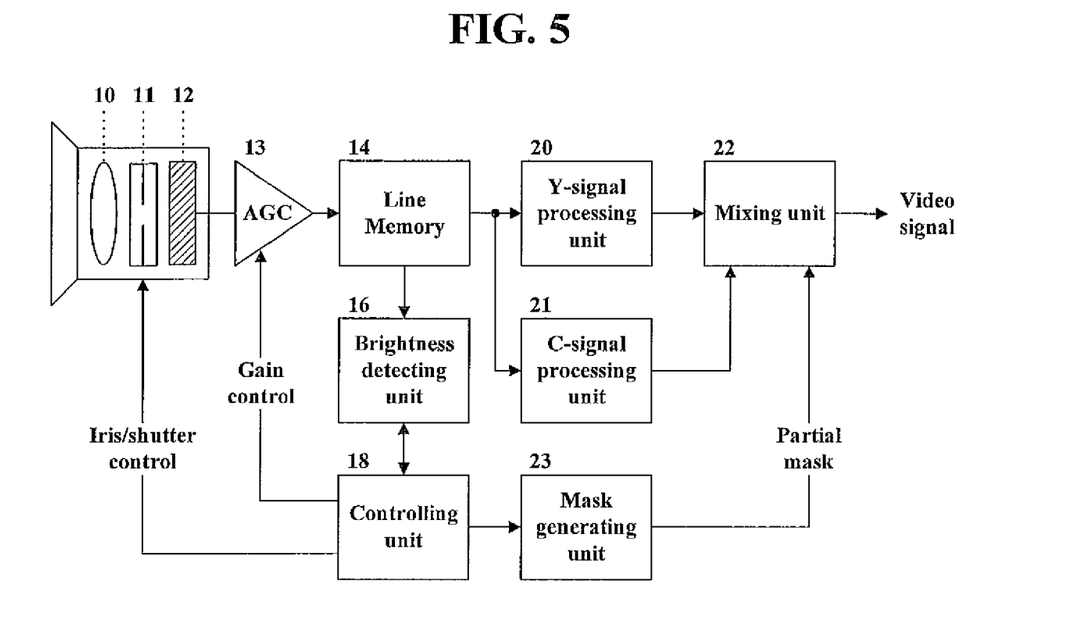
FIG. 5 is a diagram showing the construction of another embodiment of a camera to which an image processing method according to the present invention is applied.

FIG. 5 is a diagram showing the construction of another embodiment of a camera to which an image processing method according to the present invention is applied.

The camera includes a lens 10, an iris 11, a CCD 12, an AGC unit 13, line memory 14, a brightness detecting unit 16, a controlling unit 18, a luminance (Y)-signal processing unit 20, a Chrominance (C)-signal processing unit 21, and a mixing unit 22, and may further include a mask generating unit 23.

The Y-signal processing unit 20 includes the Y-Gamma correcting unit 15, which has been described with reference to FIG. 1, and the C-signal processing unit 21 includes the C-Gamma correcting unit 17. The mixing unit 22 mixes the luminance signal and the chrominance signal, which have been processed by the Y-signal processing unit 20 and the C-signal processing unit 21, respectively, and outputs the mixed signal as a video signal.

As described above, the controlling unit 18 controls the amount of light incident on the CCD 12 by adjusting the opening degree of the iris 11 and the speed of the shutter, and increases or decreases the level of each pixel signal input to the line memory 14 by adjusting the gain of the AGC unit 13. Further, the controlling unit 18 adjusts the opening degree of the iris, the shutter speed, gain, etc. on the basis of the luminance of the image, which has been determined by the brightness detecting unit 16, which detects the level of each pixel signal output through the line memory 14, thus enabling suitable exposure to be maintained. Further, the brightness detecting unit 16 determines whether a high luminance area and a low luminance area coexist in a captured image.

When both a high luminance area and a low luminance area coexist in a single captured image, the controlling unit 18 sets a partial backlight compensation mode according to the present invention, and increases the amount of light incident on the CCD 12 by adjusting the opening degree of the iris and/or the speed of the shutter until the low luminance area has luminance sufficient to be recognized, and outputs a control signal to control the mask generating unit 23.

Figure 6:
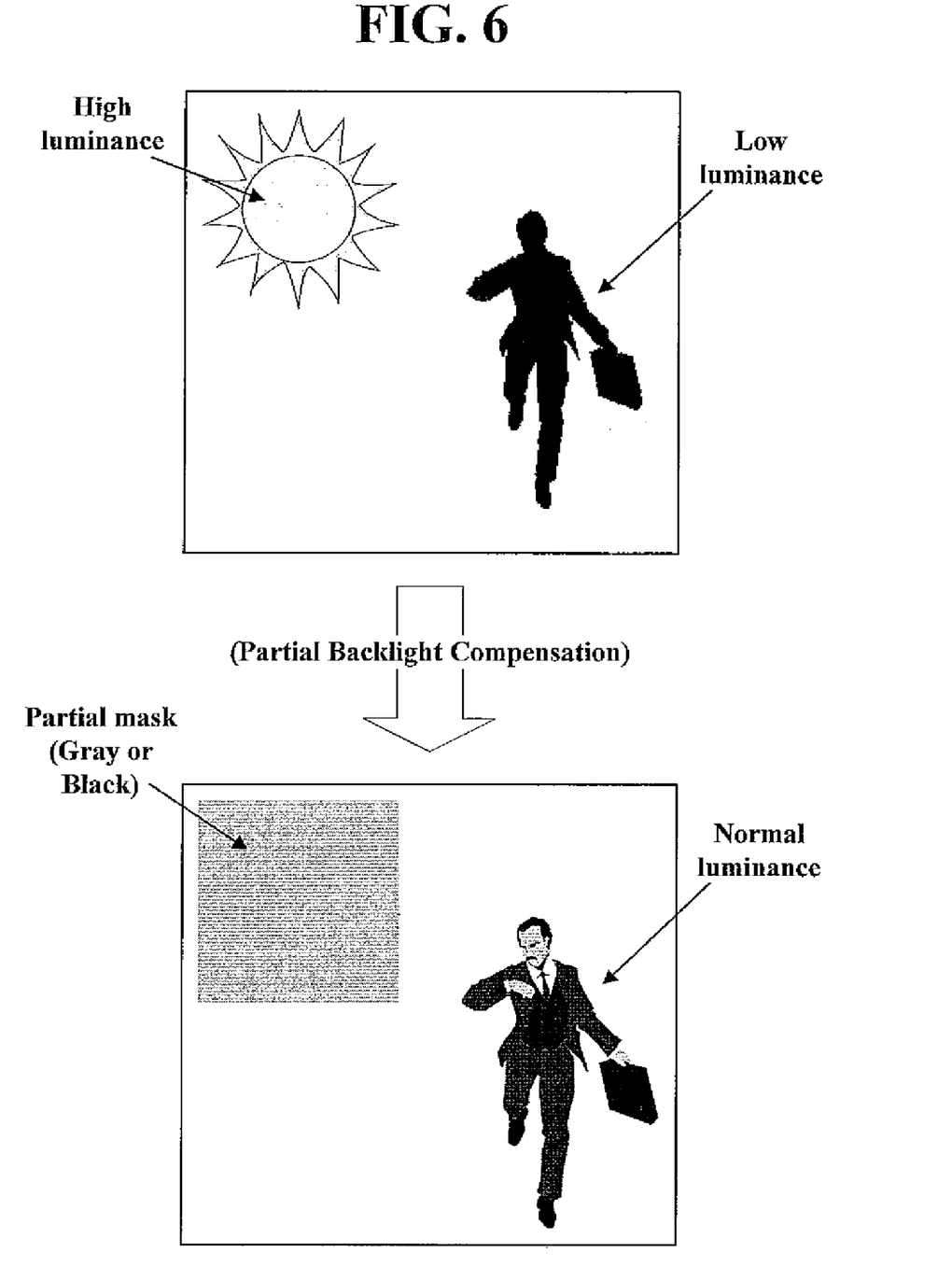
FIG. 6 is a diagram showing another embodiment of a partial backlight compensation operation according to the present invention.

The mask generating unit 23 generates a partial mask image, which has a gray level or a black level and has a size and a shape that prevent the area in which the high luminance subject is present from being displayed, in response to the control signal output from the controlling unit 18, as shown in FIG. 6, and outputs the partial mask image to the mixing unit 22.

For reference, the partial mask image can be generated in the shape of a pattern, such as a rectangle or circle, preset by the user, or can alternatively be generated in a shape corresponding to the contour of the high luminance subject using the luminance value of a pixel.

Accordingly, the opening degree of the iris 11 increases or the shutter speed decreases, and thus the amount of light incident on the CCD 12 increases. Consequently, as shown in FIG. 6, the low luminance subject included in the image is brightened and then displayed at a luminance sufficient to allow the subject to be recognized. And the high luminance subject and the partial mask image, generated by the mask generating unit 23, overlap each other, thus reducing glare caused by the high luminance subject, and facilitating the recognition of a relatively dark subject.

It is also possible to hide a high luminance subject using a translucent mask having a low luminance level or to apply oblique lines to the inside of a mask, having a shape corresponding to the high luminance subject, instead of hiding the high luminance subject using a mask having a gray level or a black level. At this time, a high luminance subject, that is, each pixel, the luminance of which exceeds a threshold, can be displayed, with the luminance thereof decreased only by a certain level.

In the two embodiments, since the operation of increasing the amount of light incident on the CCD 12 is not necessarily required, it may be omitted. The reason for this is that, even if both a high luminance area and a low luminance area coexist in a single image, there is no need to increase the luminance of the image in the case where it is possible to recognize important subjects.

Figure 7:
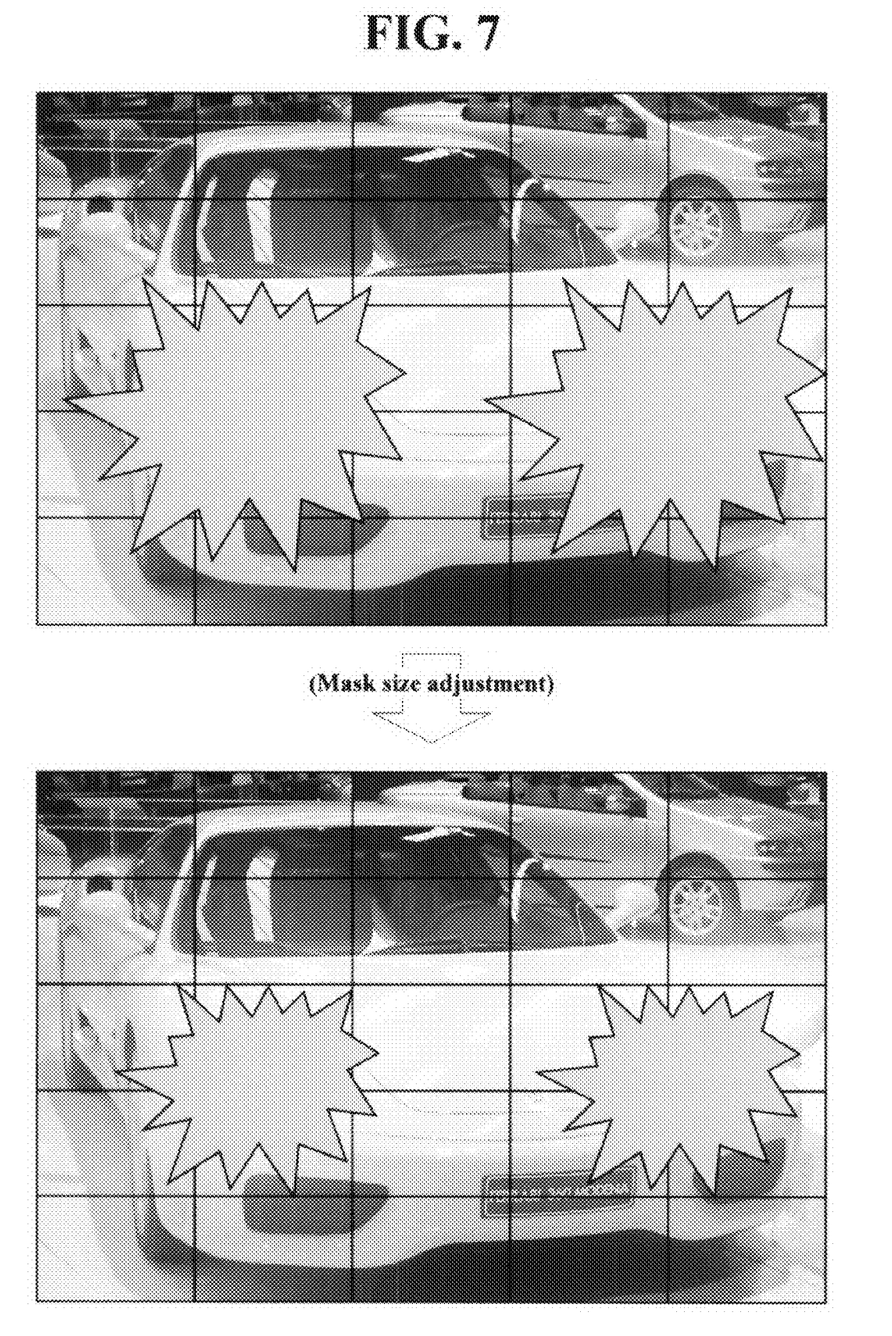
FIG. 7 is a diagram showing an embodiment for adjusting the size of a mask required for backlight compensation by adjusting a threshold, which is the basis of generation of a mask.

Meanwhile, when an opaque mask for hiding the high luminance subject is generated, part or all of a subject relatively close to the high luminance subject may also be hidden along with the high luminance subject. As shown in an embodiment of FIG. 7, a mask for hiding the headlights of a vehicle may also hide part of a license plate. In this case, the size of the mask, which hides the license plate, can be reduced, as shown in FIG. 7, by adjusting the threshold, which is the basis of generation of the mask, to a higher level.

A simple method of generating a mask may be implemented in such a way that an image is divided into a plurality of cells and masks are generated on the basis of respective division cells. For example, an average luminance value of the pixels included in each cell is calculated, and a specific cell, the average luminance value of which exceeds a predetermined threshold, is processed using a mask.

In order to generate a mask, an image can be equally divided, or can be densely divided at a center portion and roughly divided at an edge portion. The size of each division cell required to generate the mask in this case may be identical to that of the unit of division of the image required to detect luminance levels, but it is preferable that the size of the division cell be greater than that of the unit of division of the image required to detect luminance levels.

Figure 8:
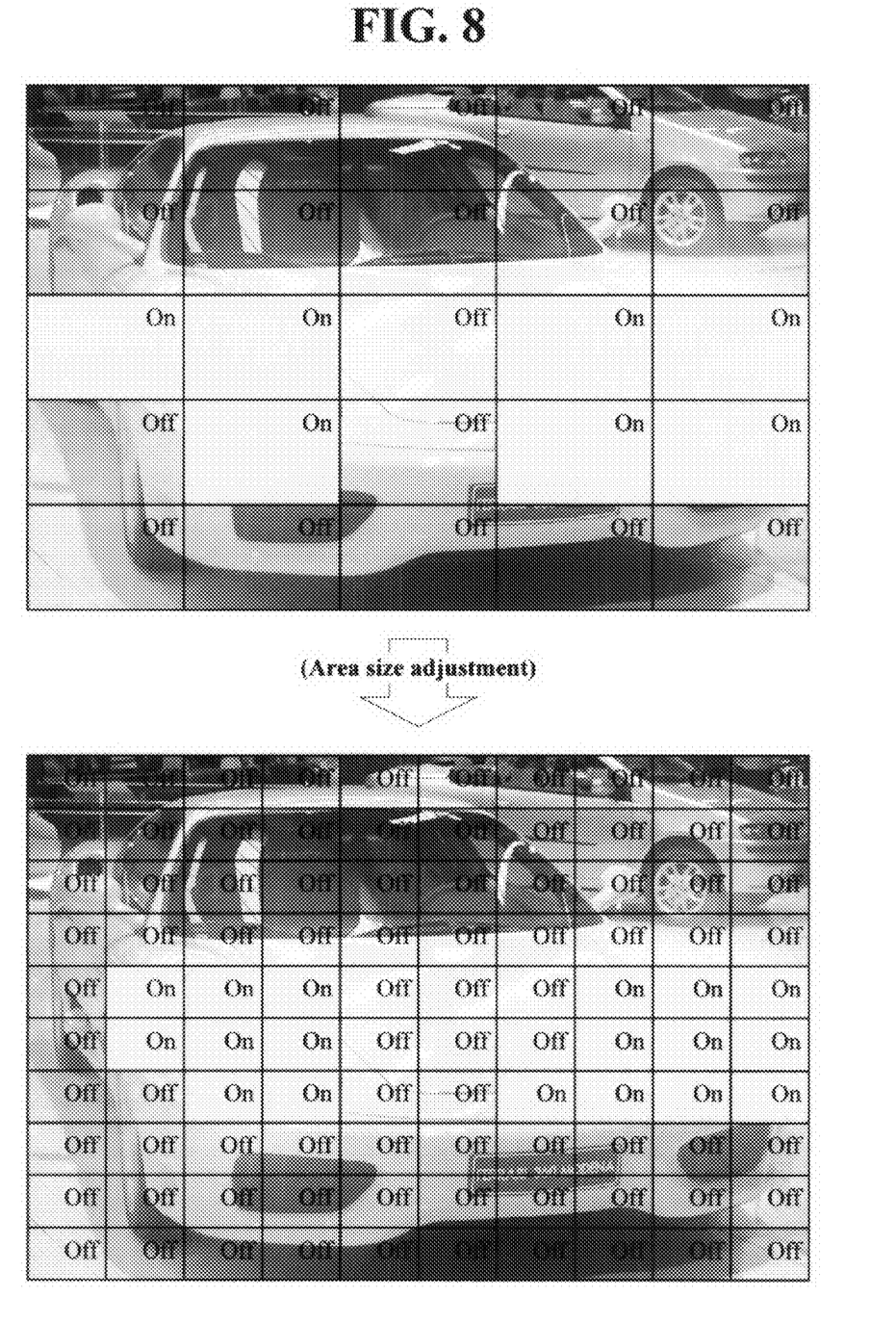
FIG. 8 is a diagram showing an embodiment for adjusting the shape of a mask by adjusting the size of a cell which is the unit of generation of a mask.

However, when the size of the division cell required to generate the mask is large, as shown in FIG. 8, the case where a mask generated to correspond to a headlight area hides part or all of the subject that is desired to be recognized may occur. In this case, the size of a cell, which is the unit of generation of the mask, is adjusted to a small size, as shown in the lower drawing of FIG. 8, thus enabling the mask to more accurately correspond to the shape of the headlight area (high luminance subject).

Therefore, the present invention is advantageous in that glare caused by a high luminance subject can be decreased, and subjects present in a backlit image can be easily recognized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image processing method, comprising:
   dividing an image captured by a camera into a plurality of areas and detecting luminance levels of the plurality of areas;
   increasing an amount of light incident on the plurality of areas; and
   adjusting a luminance level of one of the plurality of areas having a high luminance to a gray level or a black level when some of the plurality of areas have a luminance difference therebetween equal to or greater than a predetermined reference level.

2. The image processing method according to claim 1, wherein the amount of incident light is increased by adjusting an opening degree of an iris of the camera and/or a speed of a shutter of the camera.

3. The image processing method according to claim 1, wherein the predetermined reference level is a luminance difference of 45 dB.

4. The image processing method according to claim 1, wherein the luminance level is adjusted such that luminance of an area, a luminance level of which exceeds a predetermined threshold level, is decreased by a certain luminance level.

5. The image processing method according to claim 1, wherein the step of adjusting comprises:
   decreasing an output luminance level, when a luminance level of input image data is equal to or greater than a predetermined threshold, by applying a modified Gamma curve to the detected luminance levels of plurality of areas.

6. An image processing method, comprising:
   dividing an image captured by a camera into a plurality of areas and detecting luminance levels of the plurality of areas;
   increasing an amount of light incident on the plurality of areas;
   generating a mask corresponding to a high luminance area of the plurality of areas;

adjusting a luminance level of the high luminance area to a lower level when the mask is generated; and overlapping the mask with the high luminance area when some of the plurality of areas have a luminance difference therebetween equal to or greater than a predetermined reference level.

7. The image processing method according to claim 6, wherein the amount of incident light is increased by adjusting an opening degree of an iris of the camera and/or a speed of a shutter of the camera.

8. The image processing method according to claim 6, wherein the predetermined reference level is a luminance difference of 45 dB.

9. The image processing method according to claim 6, wherein the mask is generated in a pattern having a size that hides the high luminance area.

10. The image processing method according to claim 6, wherein the mask has luminance corresponding to a gray level or a black level.

11. The image processing method according to claim 6, the step of adjusting comprising:

adjusting the luminance level of the high luminance area to a gray level or a black level when the mask has a low luminance level and is translucent, or when the mask is provided with oblique lines.

12. The image processing method according to claim 11, wherein the luminance level is adjusted such that luminance of an area, a luminance level of which exceeds a predetermined threshold level, is decreased by a certain luminance level.

13. The image processing method according to claim 6, wherein the mask is generated in a shape corresponding to a contour of an area, a luminance level of which exceeds a predetermined threshold level.

14. The image processing method according to claim 13, further comprising:

adjusting the predetermined threshold level.

15. The image processing method according to claim 6,
wherein the mask is generated on a basis of a cell used to divide the image, and
wherein the mask is generated in an arbitrary cell when an average luminance value of pixels included in the arbitrary cell exceeds a predetermined threshold level.

16. The image processing method according to claim 15, further comprising adjusting a size of a cell, which is a unit of generation of the mask.

17. The image processing method according to claim 15, wherein the cell has a size different from a size of each division area used to detect the luminance levels.

18. The image processing method according to claim 17, wherein the cell has a size greater than a size of each division area used to detect the luminance levels.

19. An apparatus for image processing of a camera, comprising:

an image-capturing unit configured to capture an image;

a brightness detecting unit configured to detect a luminance level of the captured image, wherein the image captured by the image-capturing unit is divided into a plurality of areas, and the brightness detecting unit is configured to detect luminance levels of the plurality of areas; and a controlling unit configured to increase an amount of light incident on the plurality of areas, and adjust a luminance level of one of the plurality of areas having a high luminance to a gray level or a black level when some of the plurality of areas have a luminance difference therebetween equal to or greater than a predetermined reference level.

20. The apparatus for image processing of a camera according to claim 19, wherein the controlling unit is configured to decrease an output luminance level, when a luminance level of input image data is equal to or greater than a predetermined threshold, by applying a modified Gamma curve to the detected luminance levels of the plurality of areas.

21. An apparatus for image processing of a camera, comprising:

an image-capturing unit configured to capture an image, wherein the image captured by the image-capturing unit is divided into a plurality of areas;

a brightness detecting unit configured to detect a luminance level of the captured image and to detect luminance levels of the plurality of areas;

a mask generating unit configured to generate a mask corresponding to a high luminance area of the plurality of areas; and a controlling unit configured to increase an amount of light incident on the plurality of areas;

adjust a luminance level of the high luminance area to a lower level when the mask is generated, and overlap the mask with the high luminance area when some of the plurality of areas have a luminance difference therebetween equal to or greater than a predetermined reference level.

22. The apparatus of claim 21, wherein the controlling unit is configured to adjust the luminance level of the high luminance area to a gray level or a black level when the mask has a low luminance level and is translucent, or when the mask is provided with oblique lines.

* * * * *